United States Patent [19]

Hashimoto et al.

[11] Patent Number: 5,247,501
[45] Date of Patent: Sep. 21, 1993

[54] TRACKING ERROR DETECTION APPARATUS FOR AN OPTICAL DISK

[75] Inventors: Minoru Hashimoto; Hiroshi Oinoue, both of Tokyo; Takeo Tamura, Kanagawa, all of Japan

[73] Assignee: Sony Corporation, Tokyo, Japan

[21] Appl. No.: 472,820

[22] Filed: Jan. 31, 1990

[30] Foreign Application Priority Data

Feb. 3, 1989 [JP] Japan .................. 1-025567

[51] Int. Cl.$^5$ .............................. G11B 7/00
[52] U.S. Cl. ..................... 369/44.11; 369/44.14; 369/44.32
[58] Field of Search ............... 369/44.11, 44.14, 44.25, 369/44.32, 44.35, 44.36, 44.37, 44.27, 44.26, 54, 44.29, 124, 106, 116, 44.34

[56] References Cited

U.S. PATENT DOCUMENTS

| | | | |
|---|---|---|---|
| 4,748,610 | 5/1988 | Nakata et al. | 369/44.25 |
| 4,878,211 | 10/1989 | Suzuki et al. | 369/54 |
| 5,050,151 | 9/1991 | Katz | 369/44.34 |

FOREIGN PATENT DOCUMENTS

| | | |
|---|---|---|
| 0183435 | 6/1986 | European Pat. Off. |
| 0188088 | 7/1986 | European Pat. Off. |
| 3723923 | 11/1988 | Fed. Rep. of Germany |

*Primary Examiner*—Tommy P. Chin
*Assistant Examiner*—Robert Chevalier
*Attorney, Agent, or Firm*—Lewis H. Eslinger; Jay H. Maioli

[57] ABSTRACT

A recording and/or reproducing apparatus for from an optical disk includes a tracking error signal forming device for forming a tracking error signal by taking the difference of detection output signals from at least a pair of light beam detectors provided in an optical pickup having an actuator for shifting an objective lens in a focusing direction or in a tracking direction. Also provided is, a tracking servo device for moving the objective lens in the tracking direction on the basis of the output signal from the tracking error signal forming device to effect a tracking servo, a period detection device for detecting whether the period of a tracking servo indicating a relative movement between a track on an optical disk and a light beam from the optical disk is not more than a predetermined value, and a d.c. component switching device for switching the gain of an amplifier stage stepwise, with the amplifier stage being adapted for amplifying a detection output signal of one of at least a pair of light beam detectors and supplying the amplified signal to the tracking error signal forming device. An offset eliminating device controls the d.c. component switching device to effect switching of the gain of the amplifier stage stepwise to produce compensation data compensating the offset of the tracking error signal, only when the detection output from the period detection means indicates that the traverse signal is not more than a predetermined value, with the tracking servo means being off.

11 Claims, 5 Drawing Sheets

TRACKING ERROR DETECTION APPARATUS FOR AN OPTICAL DISK

BACKGROUND OF THE INVENTION

1. Field of the Invention

This invention relates to a tracking error detection apparatus for a recording and/or reproducing apparatus, in which a light beam is irradiated by an optical pickup on an optical disk to read out data signals from a track on the optical disk.

2. Prior Art

In an optical disk recording and/or reproducing apparatus in which a light beam is irradiated on an optical disk by an optical pickup to read data signals from a track on the disk, it is necessary for the light beam irradiated by the optical pickup on the optical disk to be converged on the signal recording surface of the disk (focusing direction) and to be made to follow the target track (tracking direction). Hence, focusing error signals and tracking error signals are generated from the detection output of the optical pickup for driving a so-called biaxial actuator adapted to shift an objective lens directing the light beam onto the signal recording surface of the disk by way of performing focusing servo and tracking servo control operations.

As the method for detecting tracking error in the optical disk recording and/or reproducing apparatus, there are so far known such methods as a three-beam method, a push-pull method or a wobbling method.

FIG. 1 shows the basic construction of a tracking error detection apparatus operating under a three-beam system.

This tracking error detection apparatus includes, as a photo-detector unit 10 of an optical pickup detecting the return light beam from the optical disk, a main light beam detector 1 at a position of a main light spot $BS_1$ formed by a data readout main light beam and a pair of auxiliary light beam detectors 2, 3 at the positions of auxiliary light spots $BS_2$, $BS_3$ formed by two auxiliary light beams adapted for tracking error detection.

The output detection currents obtained at the auxiliary light beam detectors 2, 3 as the output detection signals $S_2$, $S_3$ by the two auxiliary light beams by the photo-detector 10 are converted into voltage signals by means of current-to-voltage converters 11, 12, constituted by operational amplifiers 4, 5, respectively, so that the voltages are supplied to a signal subtraction circuit 13, constituted by an operational amplifier 6. The signal subtraction circuit 13 outputs a difference ($S_2$–$S_3$) of the output detection signals $S_2$, $S_3$ of the auxiliary light beams at a signal output terminal 7 as a tracking error signal $S_{TE}$.

When the light spot is moved to traverse a track on the optical disk, the tracking error signal $S_{TE}$ obtained at the signal output terminal 7, proves to be the traverse signal as shown at A in FIG. 2. On closing a tracking servo loop of the optical disk recording and/or reproducing apparatus, the tracking servo loop is formed so that the signal $S_{TE}$ is drawn towards a zero level point $P_z$.

In practice, however, an offset $DC_{OFF}$ is produced in the traverse signal, obtained as the tracking error signal $S_{TE}$ produced at the output terminal 7, as shown at B in FIG. 2, as a result of the deviation in the split light volume ratio between the (+) first order diffracted light and the (−) first order diffracted light, produced by a diffraction grating of an optical system in the optical pickup, or the difference in the photo-electric conversion sensitivities of the auxiliary detectors 2, 3. The offset $DC_{OFF}$ of the traverse signal proves to be an offset of the tracking servo loop, such that the tracking by the main beam occurs off the target track on the optical disk.

With the conventional tracking error detection apparatus, for eliminating the above offset $DC_{OFF}$, one of feedback resistors 8, 9, such as a resistor 9, of the operational amplifiers 4, 5 making up the current-to-voltage converters 11, 12, adapted for converting the output detection currents obtained at the auxiliary light beam detectors 2, 3 as the output detection signals $S_1$, $S_2$ of the two auxiliary light beams, into the corresponding voltages, is constituted as a variable resistor, so as to render the conversion constants of the current-to-voltage converting circuits 12 adjustable, by way of performing a balancing adjustment.

However, the conventional tracking error detection apparatus in which one of the feedback resistors 8, 9 of the operational amplifiers 4, 5 making up the current-to-voltage converters 11, 12 is formed as a variable resistor to eliminate the offset $DC_{OFF}$ by way of a balancing adjustment, is beset with an inconvenience that considerable time and labor are necessitated in the operation of the balancing adjustment.

The wobbling system for detecting the envelope of the RF level to dispense with the balancing adjustment is also unsatisfactory for practical application because of the highly complex system organization.

OBJECT AND SUMMARY OF THE INVENTION

It is therefore an object of the present invention to provide a recording and/or reproducing apparatus for an optical disk in which a light beam is irradiated on an optical disk by an optical pickup to read out data signals from a track on the optical disk, wherein a tracking servo loop may operate more easily and with higher accuracy.

It is another object of the present invention to provide a tracking error detection apparatus in which balancing adjustment may be automatically performed accurately and efficiently by means of a microcomputer loaded on the recording and/or reproducing apparatus for an optical disk.

According to the present invention, it is detected, during the tracking servo turnoff period, that the period of a traverse signal, indicating the relative movement between the light beam produced by the optical pickup of the recording and/or reproducing apparatus for an optical disk and the track on the disk, is lower than a predetermined level, for effecting a stepwise switching of the d.c. component of the output detection signal of one of the light beam detectors adapted to produce a tracking error signal, so as to eliminate the d.c. offset of the tracking error signal.

The above and other objects, features and advantages of the present invention will become apparent from the following description especially when read in conjunction with the accompanying drawings.

EMBODIMENTS

Figure 1:
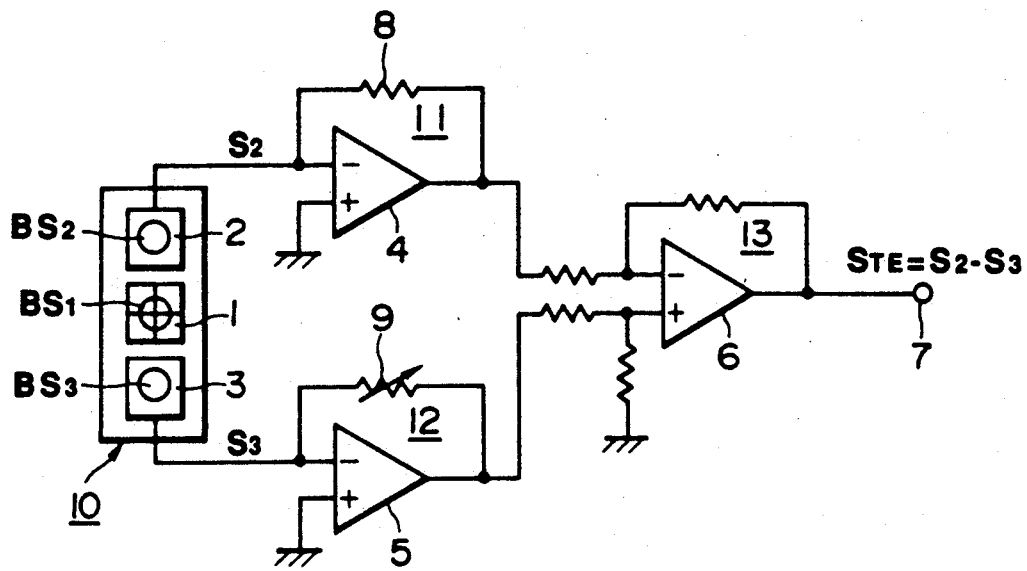
FIG. 1 is a circuit diagram showing a conventional tracking error detection apparatus of a recording and/or reproducing apparatus for an optical disk.
Figure 2A:
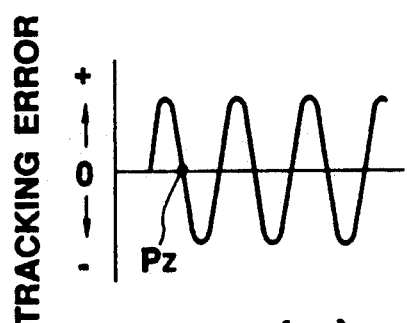
FIG. 2 consisting of FIG. 2(A) and FIG. 2(B) is a waveform diagram for illustrating the operation of the conventional tracking error detection apparatus.
Figure 2B:
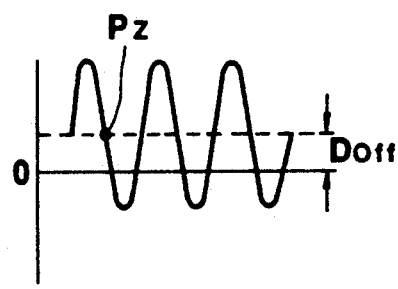

By referring to the drawings, certain illustrative embodiments of the present invention will be explained in detail.

Figure 3:
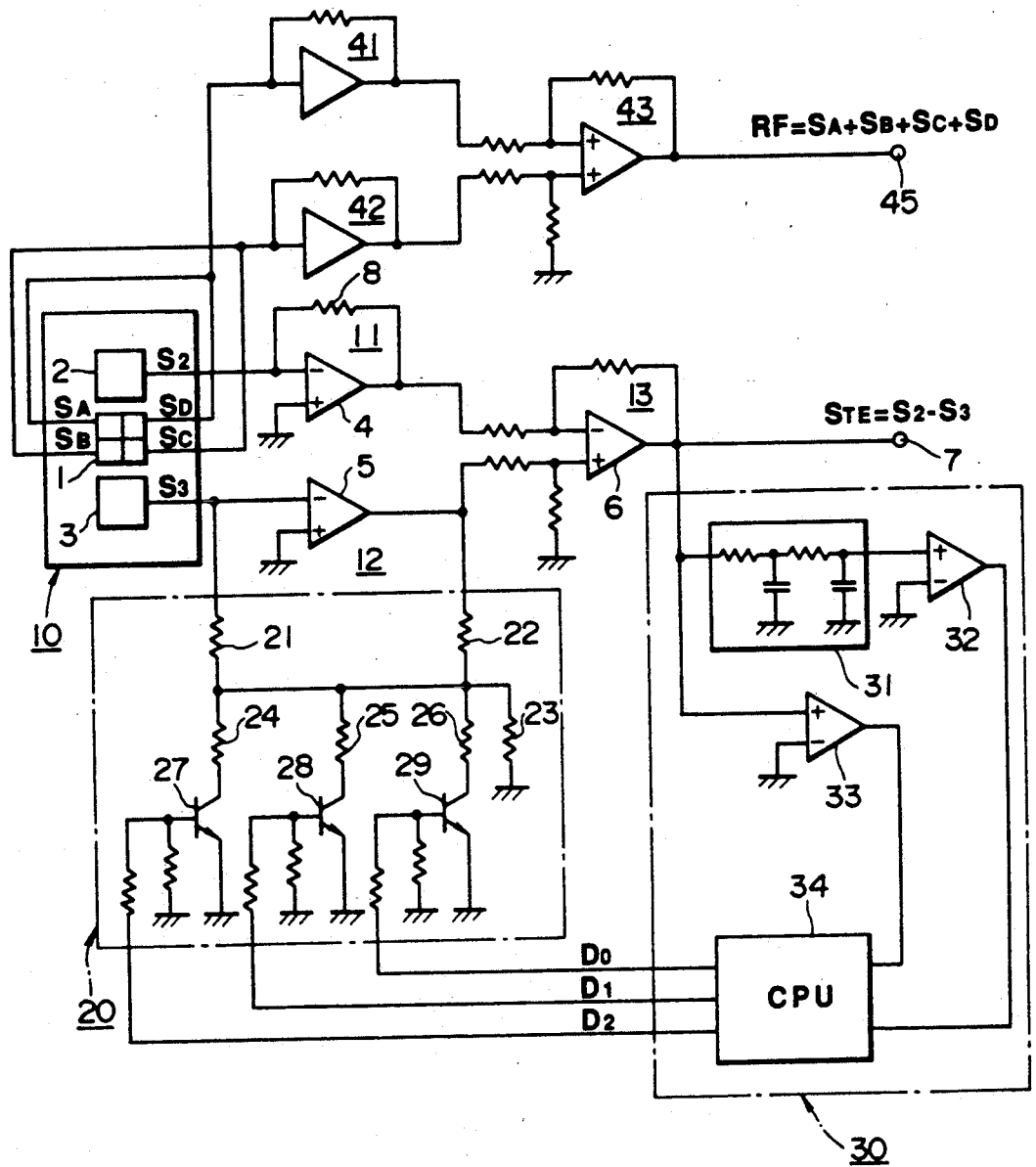
FIG. 3 is a circuit diagram showing a first embodiment of the tracking error detection apparatus of the optical disk recording and/or reproducing apparatus according to the present invention.

FIG. 3 shows a first embodiment of the present invention, wherein the present invention is applied to a tracking error detection apparatus, the basic construction of which is already explained in connection with FIG. 1. The parts and components similar to those shown in FIG. 1 are indicated in FIG. 3 by the same reference numerals.

The tracking error detection apparatus of the present first embodiment includes a feedback resistor circuit 20 in a feedback path of the operational amplifier 5 constituting a current-to-voltage converter 12 for converting into a voltage an output detection current obtained at an auxiliary light beam detector 3 as an output detection signal $S_3$ of one of two auxiliary light beams produced by the photo-detector unit 10 of the optical pickup for tracking error detection. The feedback resistor circuit 20 is adapted to switch the feedback stepwise.

The feedback resistor circuit 20 is formed by resistors 21, 22 connected in series between an inverting input and an output of the operational amplifier 5, a resistor 23 connected between a junction mid point of the resistors 21, 22 and the ground, and resistors 24, 25, 26 connected in parallel with the resistor 23 by means of switching transistors 27, 28, 29.

The current-to-voltage converting circuit 12 is so arranged that the voltage dividing ratio is switched stepwise by the turning on and off of the switching transistors 27, 28, 29 of the feedback resistor circuit 20 to switch the feedback of the operational amplifier 5 to render the conversion gain variable.

With the tracking error detection apparatus of the first embodiment, a controller 30 for effecting on/off switching control of the switching transistors 27, 28, 29 of the feedback resistor circuit 20 is arranged in the following manner.

The controller 30 is formed by a first comparator 32 fed with a tracking error signal $S_{TE}$ by way of a low-pass filter 31, a second comparator 33 fed directly with the tracking error signal $S_{TE}$, and a microcomputer 34 effecting on/off control of the switching transistors 27, 28, 29 of the feedback resistor circuit 20 on the basis of the outputs from the comparators 32, 33. The tracking error signal $S_{TE}$ is produced at the signal output terminal 7 from a signal subtraction circuit 13 to which a detection output current obtained at each of the auxiliary light beam detectors 2, 3 as detection output signals $S_2$, $S_3$ of the two auxiliary light beams by the photo-detector unit 10 of the optical pickup is supplied after conversion into voltage signals by way of the current-to-voltage conversion circuits 11, 12. A microcomputer 34 is employed which is loaded as, for example, a system controller, in the optical disk recording and/or reproducing apparatus provided with the present tracking error detection apparatus.

Figure 4:
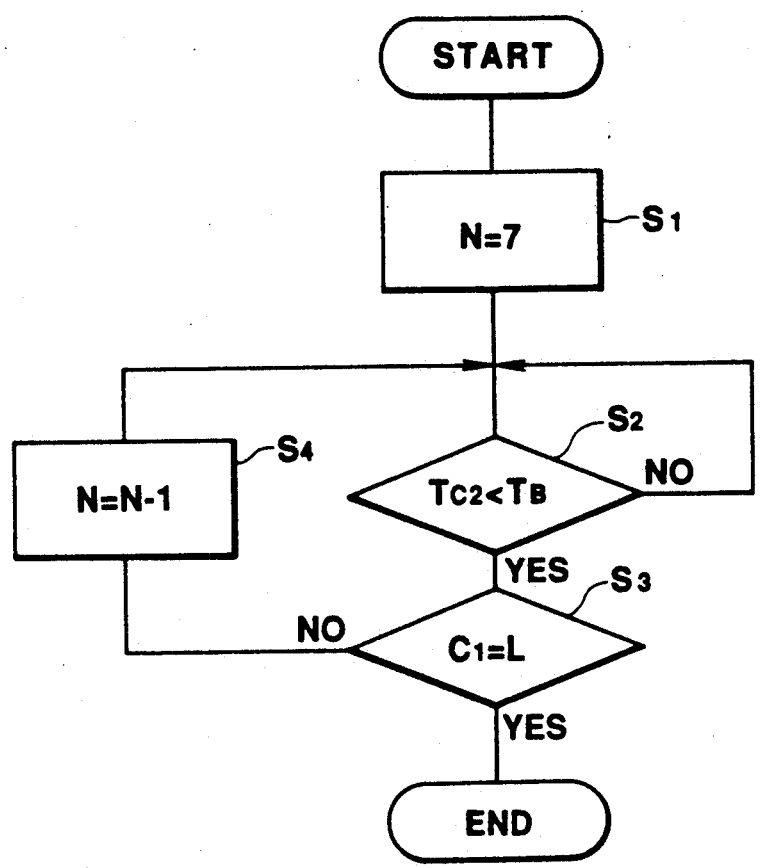
FIG. 4 is a flow chart showing the control operation for an offset adjustment mode by a controller in the first embodiment.

When the offset adjustment mode of the tracking error detection apparatus is specified, the microcomputer 34 turns the tracking servo loop off to enable the traverse signal to be generated from the signal subtraction circuit 13 as the tracking error signal $S_{TE}$ to start the control operation for the offset adjustment mode shown in the flow chart of FIG. 4.

The comparator 32 compares the average level of the traverse signal, supplied by way of the low-pass filter 31, with a zero level $0V_{DC}$, to transmit to the microcomputer 34 a comparison output signal $C_2$ which goes high when the average level of the traverse signal is higher than the zero level $0V_{DC}$. The comparator 33 directly compares the traverse signal level with the zero level $0V_{DC}$ to transmit to the microcomputer 34 a comparison output pulse $C_2$ having a pulse width corresponding to the period $T_{C2}$ of the traverse signal.

When the control operation of the offset adjustment mode is initiated, the microcomputer 34 sets a control variable N to 7 at a first step s1 by way of an initializing operation to afford three-bit control data $D_2=L$, $D_1=L$ and $D_0=L$ to the switching transistors 27, 28, 29 of the feedback resistor circuit 20 so as to turn these transistors 27 to 29 off to control the conversion gain of the current-to-voltage circuit 12 to a minimum state. The microcomputer 34 then proceeds to the second step s2.

In this second step s2, the microcomputer 34 decides, on the basis of the comparison output signal $c_2$ from the comparator 33, whether the period $T_{C2}$ of the traverse signal is less than a predetermined value $T_B$. If the result of the decision operation at step s2 is NO, that is if the period $T_{C2}$ of the traverse signal is larger than the predetermined value $T_B$, the microcomputer 34 repeats the decision operation at the step s2. When the result of the decision at step s2 becomes YES, that is when the period $T_{C2}$ of the traverse signal becomes smaller than the value $T_B$, the microcomputer proceeds to the decision operation at the next step s3.

At the third step s3, it is decided whether the comparison output signal $C_1$ from the comparator 32 is at the logically low level. When the result of the decision at the third step s3 is NO, that is when the comparison output signal $C_1$ from the comparator 32 is at the logically high level, the microcomputer 34 proceeds to the fourth step s4 to decrement the control variable N (N=N-1) to afford three-bit control data $D_2=L$, $D_1=L$, $D_0=H$ corresponding to the control variable N to the switching transistors 27, 28, 29 of the feedback resistor circuit 20 to turn the switching transistor 29 on to control the conversion gain of the current-to-voltage converter 12 so as to be one step higher than the minimum value. The microcomputer 34 than reverts to the decision operation at step s2.

By repetition of the control operation from the second step s2 to the fourth step s4 by the microcomputer 34, the conversion gain of the current-to-voltage converter 12 is raised one step each time, so that the average level of the traverse signal supplied to the comparator 32 by way of the low-pass filter 31 is also raised stepwise.

Table 1 shows the relation between the control variable N and the three-bit control data $D_2$, $D_1$, $D_0$.

TABLE 1

Relation Between Control Variable N and 3-bit control Data $D_2$, $D_1$, $D_0$

| N | $D_2$ | $D_1$ | $D_0$ |
|---|---|---|---|
| 7 | L | L | L |
| 6 | L | L | H |
| 5 | L | H | L |
| 4 | L | H | H |
| 3 | H | L | L |
| 2 | H | L | H |
| 1 | H | H | L |
| 0 | H | H | H |

When the result of decision at the step s3 becomes YES, that is when the comparison output signal $C_1$ from the comparator 32 is at the logically low level, the microcomputer 34 fetches the three-bit control data $D_2$, $D_1$, $D_0$ corresponding to the control variable N at this time point into a control memory, not shown, to terminate the control operation of the offset adjustment mode.

At a time point when the comparison output signal $D_1$ of the comparator 32 comparing the average level of the traverse signal with the zero level $0V_{DC}$ is changed from the logical "H" to the logical "L", the average level of the traverse signal is close to the zero level $0V_{DC}$. The three-bit control data $D_2$, $D_1$, $D_0$ corresponding to the control variable N at this time point are transmitted to the switching transistors 27, 28, 29 of the feedback resistor circuit 20 so as to turn the switching transistor 29 on and off to control the conversion variable of the current-to-voltage converter 12 and to output the tracking error signal $S_{TE}$ freed of the d.c. offset from the signal subtraction circuit 13 to the signal output terminal 7.

Figure 5:
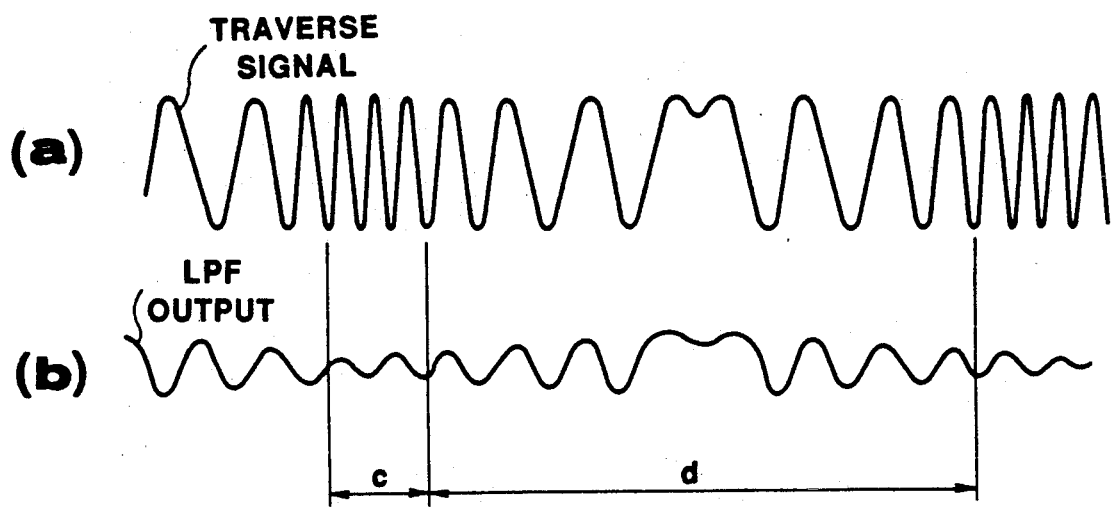
FIG. 5 is a waveform diagram for a traverse signal and a low-pass filter output for illustrating the operation for the above mentioned offset adjustment mode.
Figure 6:
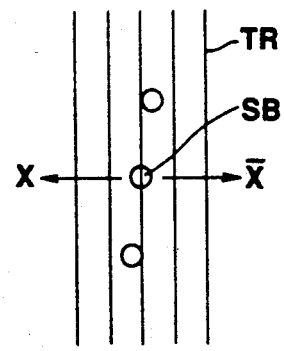
FIG. 6 is a diagrammatic view showing the status of a light spot on a track corresponding to the traverse signal shown in FIG. 5.
Figure 7:
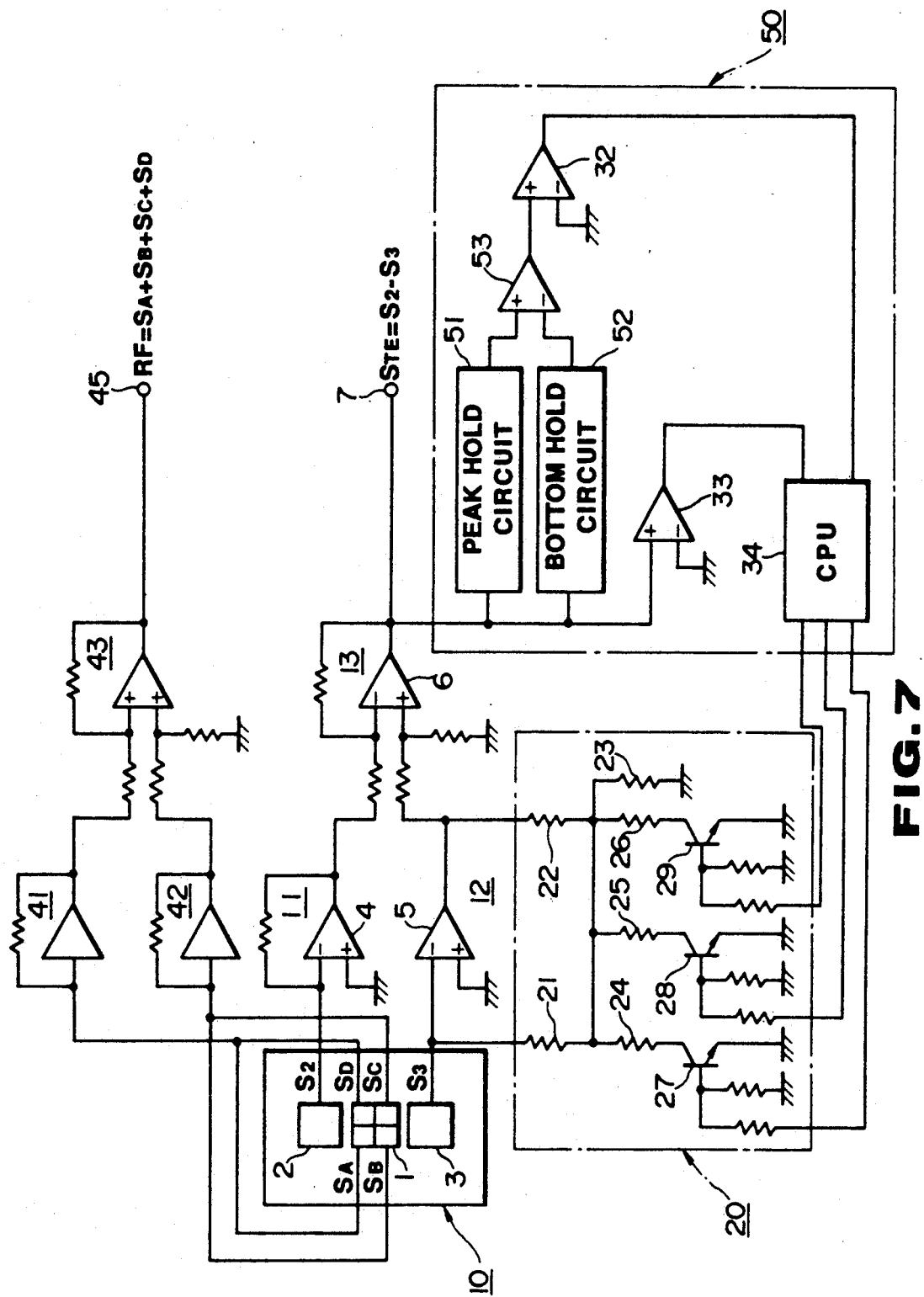
FIG. 7 is a circuit diagram showing a second embodiment of the tracking error detection apparatus of the optical disk recording and/or reproducing apparatus according to the present invention.

Since the rotation of the optical disk of the optical disk recording and/or reproducing apparatus is accompanied by an offset, the traverse signal obtained as the tracking error signal $S_{TE}$ from the signal subtraction circuit 13 during the offset adjustment mode presents a waveform as shown at a in FIG. 5, as a result of the offset. When the beam spot SB traverses a track TR, with a substantially constant rotational angle of the optical disk, as shown for example in FIG. 6, the above waveform exhibits reciprocations in the directions shown by x or x̄ in timed relation with the period of rotation, as a result of the movement of the optical disk due to the above mentioned offset, such that the amplitude becomes zero at the folding pints and becomes maximum halfway. When the traverse signal having such a waveform is passed through the low-pass filter 31, ripples are increased in a domain of a lower frequency d, as shown at b in FIG. 5. For reducing the ripples, it is sufficient if the cut-off frequency of the low-pass filter 31 is set so as to be sufficiently lower than the traverse signal frequency. However, if the cut-off frequency of the low-pass filter 31 is lowered, the response is retarded, so that the offset adjustment becomes a time-consuming operation.

With the tracking error detection apparatus of the present first embodiment, the low frequency domain d, having the period $T_{C2}$ of the traverse signal larger than the predetermined value $T_B$, is sensed by the microcomputer 34, on the basis of the comparison output pulse $C_2$ from the comparator 33, and the decision operation of the comparison output signal $C_1$ by the comparator 32 is inhibited for the domain d accompanied by ripples thus improving the adjustment accuracy. Conversely, the decision operation of the comparison output signal $C_1$ by the comparator 32 is allowed to occur for a domain c, for which the traverse signal period $T_{C2}$ is less than the predetermined value $T_B$, so that an automatic offset adjustment may be performed with high accuracy and efficiency.

With the above described tracking error detection apparatus, a so-called four-segment photo-detector is employed as a main light beam detector 1 for detecting the main light beam by the photo-detector unit 10 of the optical pickup. Output detection signals $S_A$, $S_B$, $S_C$ and $S_D$ for the main light beam by the detector 1 are transmitted to a signal summation circuit 43 by way of current-to-voltage converters 41, 42 adapted for converting the output detection current from the four-segment detector into a corresponding voltage signal, and the output summation signal $RF = S_A + S_B + S_C + S_D$ from the signal summation circuit 43 is output as the reproduction RF signal at a signal output terminal 45.

The comparator 33 may also be so arranged that a comparison output signal $C_2$ having a pulse width corresponding to the period $C_2$ of the traverse signal may be formed from a so-called mirror signal from a reproduction RF signal output from the signal output terminal 45 as a summation output signal RF by the signal summation circuit 43.

An automatic offset adjustment may also be performed with high accuracy and efficiency comparable with the first embodiment when a controller 50 formed by a peak-hold circuit 51 and a bottom-hold circuit 52, in substitution for the lowpass filter of the first embodiment, for detecting the highest and the lowest levels of the traverse signal obtained as the tracking error signal $S_{TE}$ from the signal subtraction circuit 13, and a comparator 53 for comparing the held outputs of the hold circuits 51, 52. That is, the highest signal level and the lowest signal level of the traverse signal, is employed to perform an on/off control of the switching transistors 27, 28, 29 and the switching transistor 29 of the feedback resistor circuit 20 to control the conversion gain of the current-to-voltage converter 12.

In the second embodiment, the parts or components similar to those of the first embodiment are indicated by the same reference numerals, and the detailed description therefor is omitted for simplicity.

According to the present invention, as described hereinabove, when the tracking servo is off, an output signal from a period detection means for detecting whether or not the period of the traverse signal indicating the relative movement between a light beam obtained from the optical pickup of the optical disk recording and/or reproducing apparatus and a track on the disk is not more than a predetermined value is used to control a d.c. component switching means only when the period of the traverse signal is below the predetermined value for switching the d.c. component of the output detection signal of one of the light beam detectors forming the tracking error signal stepwise to eliminate the d.c. offset of the tracking error signal, so that an automatic offset adjustment may be performed with high accuracy and efficiency. That is, the detection and processing of the d.c. component of the traverse signal is inhibited for a domain of the traverse signal accompanied by large ripples and having the traverse signal period larger than the predetermined value for improving the adjustment accuracy. On the other hand, the detection and processing of the d.c. component of the traverse signal is permitted to occur for the domain having the higher frequency and having the traverse signal period less than a predetermined value, so that the offset adjustment may be performed with high accuracy and efficiency.

What is claimed is:

1. A tracking error detection apparatus for an optical disk recording and/or reproducing apparatus that includes a movable optical pickup having a photo-detector unit formed of a plurality of light beam detectors and producing a light beam, the detection apparatus comprising:

tracking error signal forming means for forming a tracking error signal by taking a difference between detection output signals from a pair of the light beam detectors provided in the optical pickup;

period detection means for detecting whether a period of the tracking error signal indicating a relative movement between a light beam from said optical pickup and a track on said disk is not more than a predetermined value;

d.c. component switching means for switching in a stepwise manner a d.c. level of a detection output signal of one of said light beam detectors; and offset eliminating means for controlling said d.c. component switching means to effect stepwise switching of the detection output signal of one of said light beam detectors only when an output from said period detection means indicates said tracking error signal is not more than said predetermined value.

2. The tracking error detection apparatus according to claim 1 wherein said offset eliminating means includes average level sensing means for sensing an average level of said tracking error signal, comparator means for comparing an output of said average level sensing means and a reference level, and control means for performing switching control of said d.c. component switching means when a comparison output of said comparator means indicates that said average level is higher than said reference level.

3. The tracking error detection apparatus according to claim 2 wherein said control means performs switching control of said d.c. component switching means so that the d.c. level of an output detection signal of said one of the light beam detectors is raised one step each time when said average level is higher than said reference level, said control means continuing said switching control in a stepwise manner until the comparison output from said comparator means indicates that said average level is equal to said reference level.

4. The tracking error detection apparatus according to claim 3 wherein said control means includes memory means for storage of switching control data at a time when said average level becomes equal to said reference level.

5. The tracking error detection apparatus according to claim 2 wherein said average level detection means includes peak holding means for holding a peak value of said tracking error signal, bottom holding means for holding a bottom value of said tracking error signal, and subtraction means for taking a difference between outputs of said peak holding means and said bottom holding means.

6. A tracking error detection apparatus for a recording and/or reproducing apparatus for an optical disk that includes an objective lens and a movable optical pickup having a photo-detector unit formed of a plurality of a light beam detectors and producing a light beam, the detection apparatus comprising:

tracking error signal forming means for forming a tracking error signal by taking a difference between detection output signals from a pair of the light beam detectors provided in the optical pickup that further has an actuator for shifting an objective lens thereof in both a focusing direction and in a tracking direction;

tracking servo means for moving said objective lens in the tracking direction in response to an output signal from said tracking error signal forming means to effect a tracking servo;

period detection means for detecting whether a period of a tracking servo indicating a relative movement between a track on an optical disk and a light beam reflected from said optical disk is not more than a predetermined value;

d.c. component switching means for switching a gain of an amplifier stage stepwise, said amplifier stage being adapted for amplifying a detection output signal of one of the pair of light beam detectors and supplying an amplified signal to said tracking error signal forming means; and offset eliminating means for controlling said d.c. component switching means to effect switching of a gain of said amplifier stage stepwise to produce compensation data for compensating an offset of said tracking error signal only when a detection output from said period detection means indicates that said tracking error signal is not more than a predetermined value, with the tracking servo means being off, wherein tracking servo is performed by said tracking servo means in response to said compensation data from said offset eliminating means when said tracking servo means is on.

7. The detection apparatus for recording and/or reproducing apparatus according to claim 6 wherein said compensation data from said offset eliminating means comprise control data for said d.c. component switching means controlling the gain of said amplifier stage and eliminating the offset of said tracking error signal.

8. The detection apparatus for recording and/or reproducing apparatus according to claim 6 wherein said offset eliminating means includes average level sensing means for sensing an average level of said tracking error signal, comparator means for comparing a detection output of said average level sensing means with a reference level and control means for performing a switching control of said d.c. component switching means when a comparison output of said comparator means indicates that said average level is higher than said reference level.

9. The detection apparatus for recording and/or reproducing apparatus according to claim 8 wherein said control means performs a switching control of said d.c. component switching means so that the gain of said amplifier stage is raised one step each time the average level of said tracking error signal is higher than said reference level, said control means continuing the switching control of said d.c. component switching means until the average level becomes equal to said reference level.

10. The detection apparatus for recording and/or reproducing apparatus according to claim 9 wherein said control means includes memory means for storage of switching control data at the time when said average becomes equal to said reference level.

11. The detection apparatus for recording and/or reproducing apparatus according to claim 8 wherein said average level detection means includes peak holding means for holding a peak value of said tracking error signal, bottom holding means for holding a bottom value of said tracking error signal, and subtraction means for taking a difference between outputs of said peak holding means and said bottom holding means.

* * * * *